(12) United States Patent
Shibata et al.

(10) Patent No.: US 8,650,706 B2
(45) Date of Patent: Feb. 18, 2014

(54) CORDED HOSE AND DUST COLLECTOR

(75) Inventors: Yoshinori Shibata, Anjo (JP); Kazunori Tsuge, Anjo (JP)

(73) Assignee: Makita Corporation, Aichi (JP)

( * ) Notice: Subject to any disclaimer, the term of this patent is extended or adjusted under 35 U.S.C. 154(b) by 519 days.

(21) Appl. No.: 13/063,114

(22) PCT Filed: Aug. 19, 2009

(86) PCT No.: PCT/JP2009/003944
§ 371 (c)(1),
(2), (4) Date: Mar. 9, 2011

(87) PCT Pub. No.: WO2010/047025
PCT Pub. Date: Apr. 29, 2010

(65) Prior Publication Data
US 2011/0162164 A1    Jul. 7, 2011

(30) Foreign Application Priority Data

Oct. 21, 2008  (JP) .................. 2008-271243

(51) Int. Cl.
*A47L 9/24* (2006.01)
*H01R 39/00* (2006.01)

(52) U.S. Cl.
USPC .............. 15/339; 15/323; 174/47; 439/23; 439/191; 439/192

(58) Field of Classification Search
USPC ......... 15/321, 323, 339; 174/47; 439/23, 191, 439/192
IPC .................... A47L 9/24; H01R 39/00
See application file for complete search history.

(56) References Cited

U.S. PATENT DOCUMENTS

| | | | |
|---|---|---|---|
| 3,127,227 | A | 3/1964 | Edwards |
| 4,162,370 | A | 7/1979 | Dunn et al. |
| 5,277,459 | A | 1/1994 | Braun et al. |
| 6,015,298 | A | 1/2000 | Linhart |
| 2004/0089639 | A1 | 5/2004 | Raymond et al. |

FOREIGN PATENT DOCUMENTS

| | | |
|---|---|---|
| DE | 200 16 447 U1 | 1/2001 |
| EP | 0 442 505 A2 | 8/1991 |
| EP | 0 791 775 A1 | 8/1997 |
| JP | A-54-34557 | 3/1979 |
| JP | U-6-40562 | 5/1994 |
| JP | A-2002-224631 | 8/2002 |
| WO | WO 98/17936 | 4/1998 |

OTHER PUBLICATIONS

International Search Report for International Patent Application No. PCT/JP2009/003944, mailed on Sep. 29, 2009.
Extended European Search Report issued in European Patent Application No. 09821726.8 dated Mar. 15, 2013.

*Primary Examiner* — David Redding
(74) *Attorney, Agent, or Firm* — Oliff PLC

(57) ABSTRACT

A hose equipped with a cord, wherein the hose and the cord can be easily assembled together and easily maintained. A cord-equipped hose, wherein opposite ends of a flexible hose are respectively provided with tube holders each constructed from a pair of half tubes. The tube holders each sandwich an end of the flexible hose with the pair of half tubes joined together and each form, between the joined ends of the half tubes, a lead-out opening for an electric power source cord. Opposite ends of the electric power source cord in the flexible hose are respectively led out of the lead-out openings of the tube holders and held in position.

10 Claims, 4 Drawing Sheets

CORDED HOSE AND DUST COLLECTOR

TECHNICAL FIELD

The present invention relates to a corded hose equipped with a power cord for use in a dust collector or the like, and to a dust collector to which the corded hose is connected.

BACKGROUND ART

When performing an operation such as cutting, drilling, or the like by means of an electric tool such as a circular saw, a drill, or the like, a dust collector is connected to the electric tool in some cases to collect powder dust and the like. In such cases, the powder dust produced at an operation spot is collected by the dust collector without being scattered, with a connection of the electric tool and the dust collector to each other by a hose and operating the dust collector during the use of the electric tool.

In particular, a certain type of dust collector is provided with a socket for supplying power to an external component, so that power for the electric tool can be supplied from the dust collector by plugging a power cord of the electric tool into the socket. In this case, however, the hose and the power cord are connected between the electric tool and the dust collector respectively and hence hinder the operation. Accordingly, as a measure against this hindrance, according to the invention described in Patent Document 1, a hose section, which is equipped close to both ends thereof with cylindrical couplings having cable outlets respectively and has a cable guide channel accommodated therein, is provided between an electric tool and a dust collector, and a power cord is passed through a cable guide passage formed of the cable outlets and the cable guide channel to integrate the power cord and the hose with each other.

[Patent Document 1] German Utility Model Application Publication No. 20016447

DISCLOSURE OF THE INVENTION

Problem to be Solved by the Invention

However, the corded hose according to Patent Document 1 requires the power cord to be removed from and put into the cable outlets provided in the cylindrical couplings, and hence is difficult to assemble. Further, the cable guide channel is integrally provided in the hose section. Therefore, even in the case where, for example, only one of the hose section and the cable guide channel is broken, the entire corded hose needs to be replaced. This leads to poor repairing properties.

It is therefore an object of the present invention to provide a corded hose and a dust collector with good assembling properties and good repairing properties.

Means for Solving the Problem

In order to achieve the above-stated object, the invention according to claim 1 provides a corded hose characterized by including a hose, a power cord extending through the hose, and cylindrical holders provided at both ends of the hose respectively. Each of the cylindrical holders sandwiches a corresponding one of ends of the hose in a state in which a pair of half cylinders are assembled with each other, and forms a pullout port of the power cord between assembled ends of the half cylinders. In the corded hose, each of both the ends of the power cord in the hose is pulled out to an outside from the pullout port of a corresponding one of the holders and held.

Further, in addition to the aforementioned invention, in order to further improve assembling properties, each of the holders may be assembled by engaging an engaging pawl formed on one of the half cylinders with an engaged portion formed in the other half cylinder. In order to favorably protect the hose, the hose may be sheathed with a flexible sleeve-like cover, and be provided, on an outer periphery thereof at positions corresponding to both ends of the cover, with fixation cylinders respectively, each of the fixation cylinders being composed of a pair of half cylinders to fix the cover to the hose in a state of being assembled with the hose. In order to make it possible to restrain the efficiency of collecting dust from deteriorating even when the power cord is extended through the hose, at least one of the half cylinders of each of the holders may be provided with a rib that keeps the power cord from moving toward a center of the holder at a pullout position of the power cord.

In order to achieve the above-stated object, the invention according to claim 10 provides a dust collector characterized by including a suction port, a socket for supplying power to an external component, and the corded hose according to claim 1 with one of the holders connected to the suction port and with the power cord on the holder side connected to the socket. In the dust collector, the other holder of the corded hose and the power cord on the holder side are connectable to an electric tool and a power cord thereof respectively.

Effects of the Invention

According to the invention in claims 1 and 10, owing to the holders, the power cord can be easily pulled out from the hose, and assembling properties is improved. Further, the component parts such as the hose, the power cord, and the like can be replaced individually. Therefore, good repairing properties are ensured as well.

In particular, when each of the holders is assembled by engaging the engaging pawl with the engaged portion, it is easy to attach the holders to the hose and remove the holders from the hose. As a result assembling properties is further improved.

Further, when the fixation cylinders are provided on the outer periphery of the hose at positions corresponding to both the ends of the cover respectively, the cover can be fixed with ease. As a result, the hose is protected favorably.

Furthermore, when each of the holders is provided with the rib, the power cord extends along an inner face of the hose, and the resistance against the flow of air and powder dust in the hose is reduced. Accordingly, the efficiency of collecting dust can be restrained from deteriorating even when the power cord is extended through the hose.

BEST MODE FOR CARRYING OUT THE INVENTION

An embodiment of the present invention will be described hereinafter on the basis of the drawings.

Figure 1:
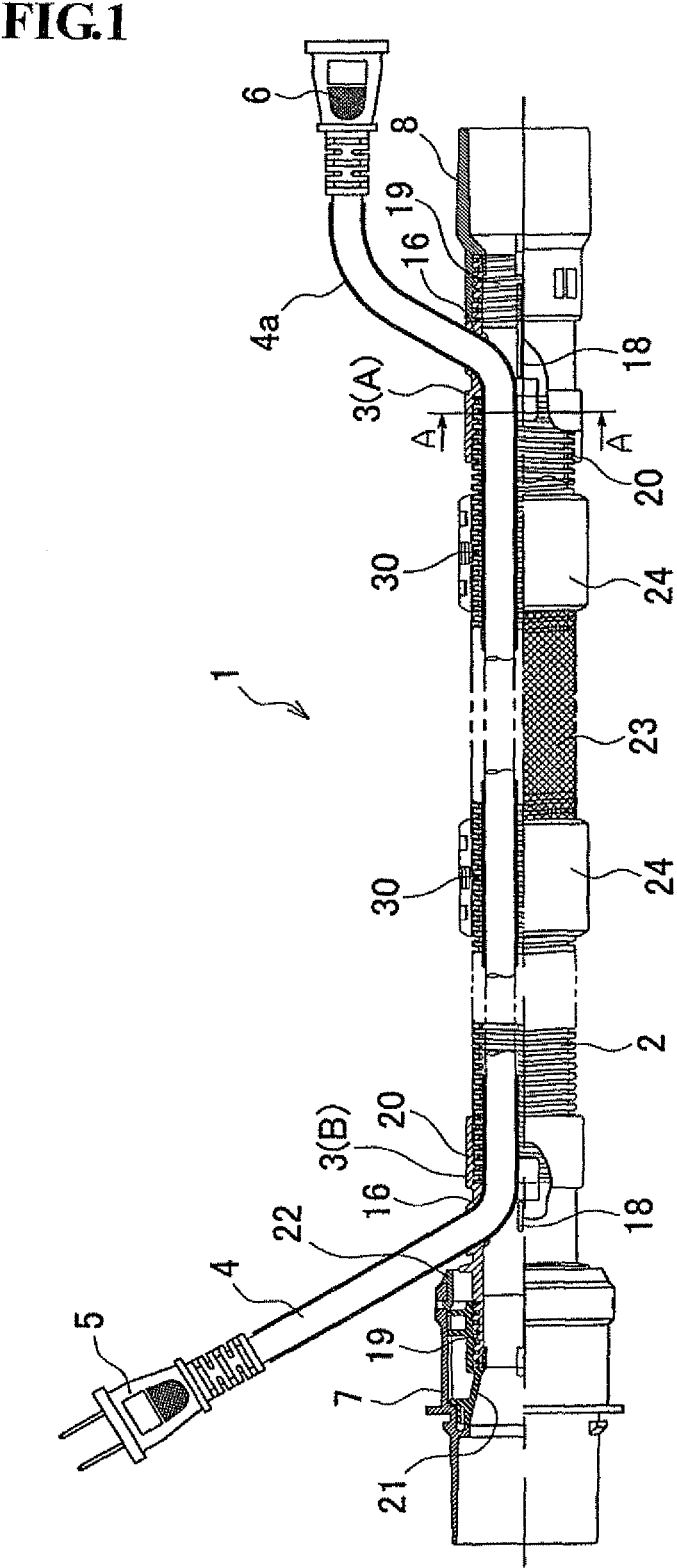
FIG. 1 is an overall illustrative view of a corded hose.

FIG. 1 is an illustrative view showing an example of a corded hose. A corded hose 1 is constructed by connecting tube holders 3 and 3 as holders to both ends of a bellows-type flexible hose 2 and pulling out a plug 5 and a connector 6, which are located respectively at both ends of a power cord 4 extended through the flexible hose 2, to the outside from the tube holders 3 and 3 respectively. The power cord 4 is sheathed with a protection cover 4a except at locations corresponding to the plug 5 and the connector 6. A cylindrical rear cuff coupled to the rear (on the left side in FIG. 1) tube holder 3B (the front tube holder and the rear tube holder are denoted by reference symbols 3A and 3B respectively when making a distinction between the tube holders 3) and connected to a dust collector is denoted by 7, and a cylindrical front cuff coupled to the front tube holder 3A and connected to an electric tool such as a circular saw or the like is denoted by 8.

Figure 2:
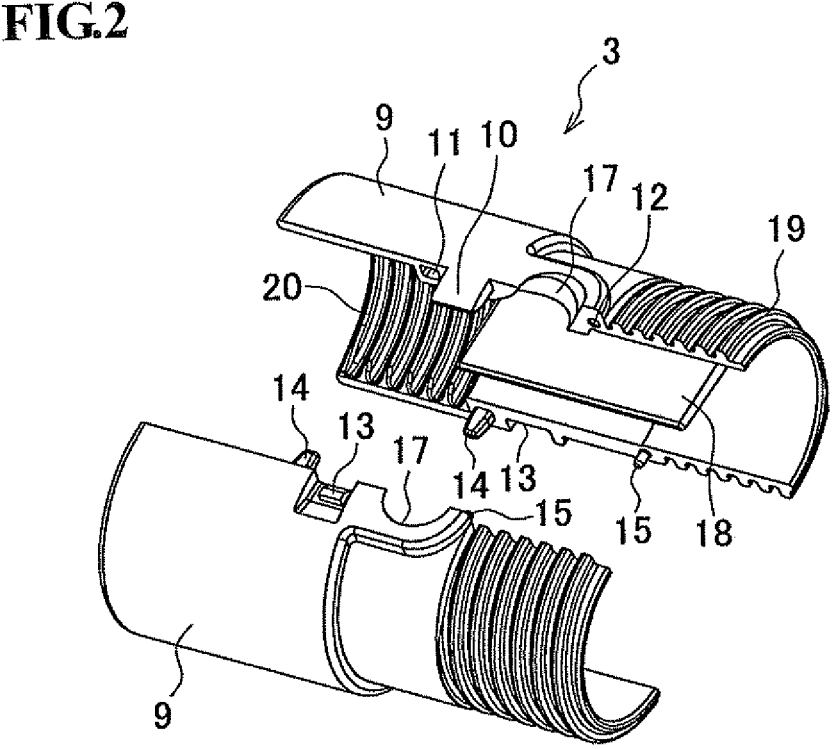
FIG. 2 is an exploded perspective view of a tube holder.

As shown in FIG. 2, each of the tube holders 3 is constructed by assembling a pair of half cylinders 9 and 9 made of synthetic resin with each other. Formed at an assembled end of one of the respective half cylinders 9 are an engaging pawl 10 protruding toward the other half cylinder 9 side and two holes, namely, a large hole 11 and a small hole 12 located on both sides of the engaging pawl 10 respectively. On the other hand, formed at an assembled end of the other half cylinder 9 are an engaged portion 13 engaged by the engaging pawl 10 in an assembled state and two positioning protrusions, namely, a large positioning protrusion 14 and a small positioning protrusion 15 inserted in the holes 11 and 12 respectively in the assembled state. Accordingly, when the half cylinders 9 and 9 are assembled with each other, the engaging pawl 10 elastically engages the engaged portion 13, and the positioning protrusions 14 and 15 are inserted into the holes 11 and 12 at the assembled ends respectively. As a result, the tube holders 3 are assembled.

Figure 3:
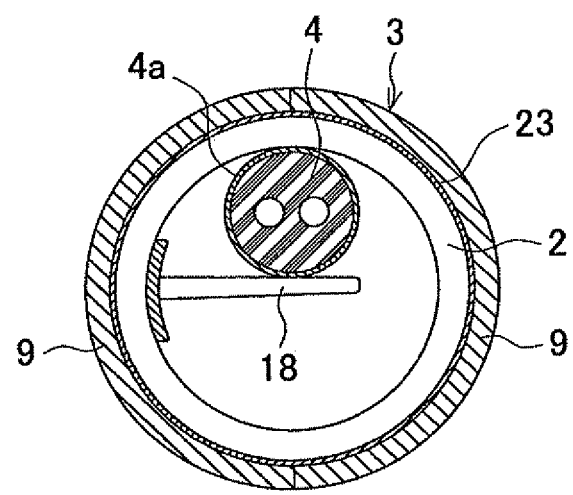
FIG. 3 is an enlarged cross-sectional view taken along a line A-A.

Further, a pullout port 16 of the power cord 4 is formed in an upper side of the tube holder 3 substantially at a longitudinal center thereof. The pullout port 16 is formed open in an inclined manner by semicircular notches 17 and 17 formed at the assembled ends of the half cylinders 9 respectively. The pullout port 16 of the rear tube holder 3B is inclined upward and backward, and the pullout port 16 of the front tube holder 3A is inclined upward and forward. Furthermore, as shown in FIG. 3 as well, formed integrally on an inner periphery of one of the half cylinders 9 is a plate-like rib 18 that protrudes laterally below the pullout port 16 from the upper assembled end at a distance approximately equal to an outer diameter of the power cord 4 and has a tip reaching an interior of the other half cylinder 9 in an assembled state.

A threaded portion 19 is formed on an outer periphery of a rear portion of the rear tube holder 3B by protrusion strips formed on the half cylinders 9 respectively, and protrusion strips 20, 20, . . . 20 engaging bellows formed on an outer periphery of the flexible hose 2 are formed on an inner periphery of a front portion of the rear tube holder 3B. The tube holder 3B is coupled to the rear cuff 7 by screwing the rear threaded portion 19 into a sleeve 21 held inside the rear cuff 7. A stopper ring fitted to a front end of the rear cuff 7 to stop the sleeve 21 from coming off is denoted by a reference symbol 22.

By the same token, a threaded portion 19 is formed on an outer periphery of a front portion of the front tube holder 3A by protrusion strips formed on the half cylinders 9 respectively, and protrusion strips 20, 20, . . . 20 engaging the bellows of the flexible hose 2 are formed on an inner periphery of a rear portion of the front tube holder 3A. The tube holder 3A is coupled to the front cuff 8 by screwing the front threaded portion 19 into the front cuff 8.

Figure 4:
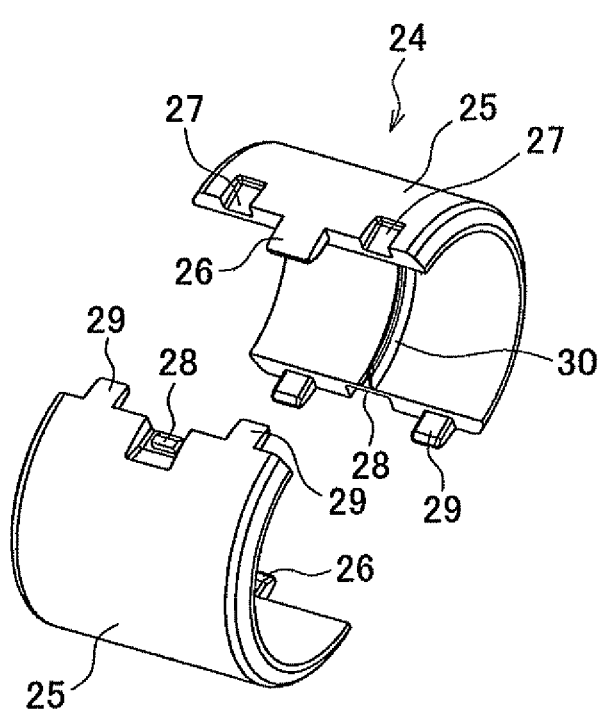
FIG. 4 is an exploded perspective view of a mesh cover.

On the other hand, the flexible hose 2 is sheathed with a sleeve-like mesh cover 23, and two cover holders 24 and 24 as fixation cylinders are assembled with an outer periphery of the flexible hose 2 at positions corresponding to both ends of the mesh cover 23. As shown in FIG. 4, each of these cover holders 24 is constructed by assembling a pair of half cylinders 25 and 25 made of synthetic resin with each other as is the case with the tube holders 3. Formed at an assembled end of one of the respective half cylinders 25 are an engaging pawl 26 protruding toward the opposite half cylinder 25 side and a pair of positioning recess portions 27 and 27 located on both sides of the engaging pawl 26 respectively. Formed at an assembled end of the other half cylinder 25 are an engaged portion 28 engaged by the engaging pawl 26 in an assembled state and a pair of positioning protrusions 29 and 29 engaging the positioning recess portions 27 and 27 also in the assembled state. Further, a protrusion strip 30 engaging the bellows of the flexible hose 2 is formed on an inner periphery of each of the half cylinders 25 substantially at an axial center thereof.

Accordingly, when the half cylinders 25 and 25 are assembled with each other, the engaging pawl 26 elastically engages the engaged portion 28 at each of the assembled ends, and the positioning protrusions 29 and 29 engage the positioning recess portions 27 and 27 respectively. The cover holder 24 is thereby assembled with the flexible hose 2. In this assembled state, the protrusion strip 30 engages the bellows of the flexible hose 2 together with the mesh cover 23. Therefore, the mesh cover 23 is integrated with the flexible hose 2 without being displaced.

In the corded hose 1 constructed as described above, first of all, the power cord 4 is extended through the flexible hose 2 sheathed with the mesh cover 23 and assembled with the cover holders 24, with the plug 5 and the connector 6 located behind and in front respectively. Subsequently, the tube holders 3 are coupled to both the ends of the flexible hose 2 respectively. That is, each of the ends of the flexible hose 2 is sandwiched by the ends of the half cylinders 9 and 9 located on the protrusion strip 20 side. In the tube holder 3A, the end of the power cord 4 located on the connector 6 side is sandwiched by notches 17, and in the tube holder 3B, the end located on the plug 5 side is sandwiched by the notches 17. Thus, the half cylinders 9 and 9 are assembled with each other.

Thus, the ends of the flexible hose 2 are held by the tube holders 3 respectively, and the power cord 4 is held with each of the ends thereof pulled out to the outside through the pullout port 16. At this moment, as shown in FIG. 3, the rib 18 keeps the power cord 4 from moving toward the center of each of the tube holders 3. Therefore, the power cord 4 extends through the flexible hose 2 along the inner periphery of the flexible hose 2 above the rib 18. Then, when the threaded portion 19 of the tube holder 3A and the threaded portion 19 of the tube holder 3B are screwed into the front cuff 8 and the sleeve 21 of the rear cuff 7 respectively, the assembly of the corded hose 1 is completed.

Figure 5:
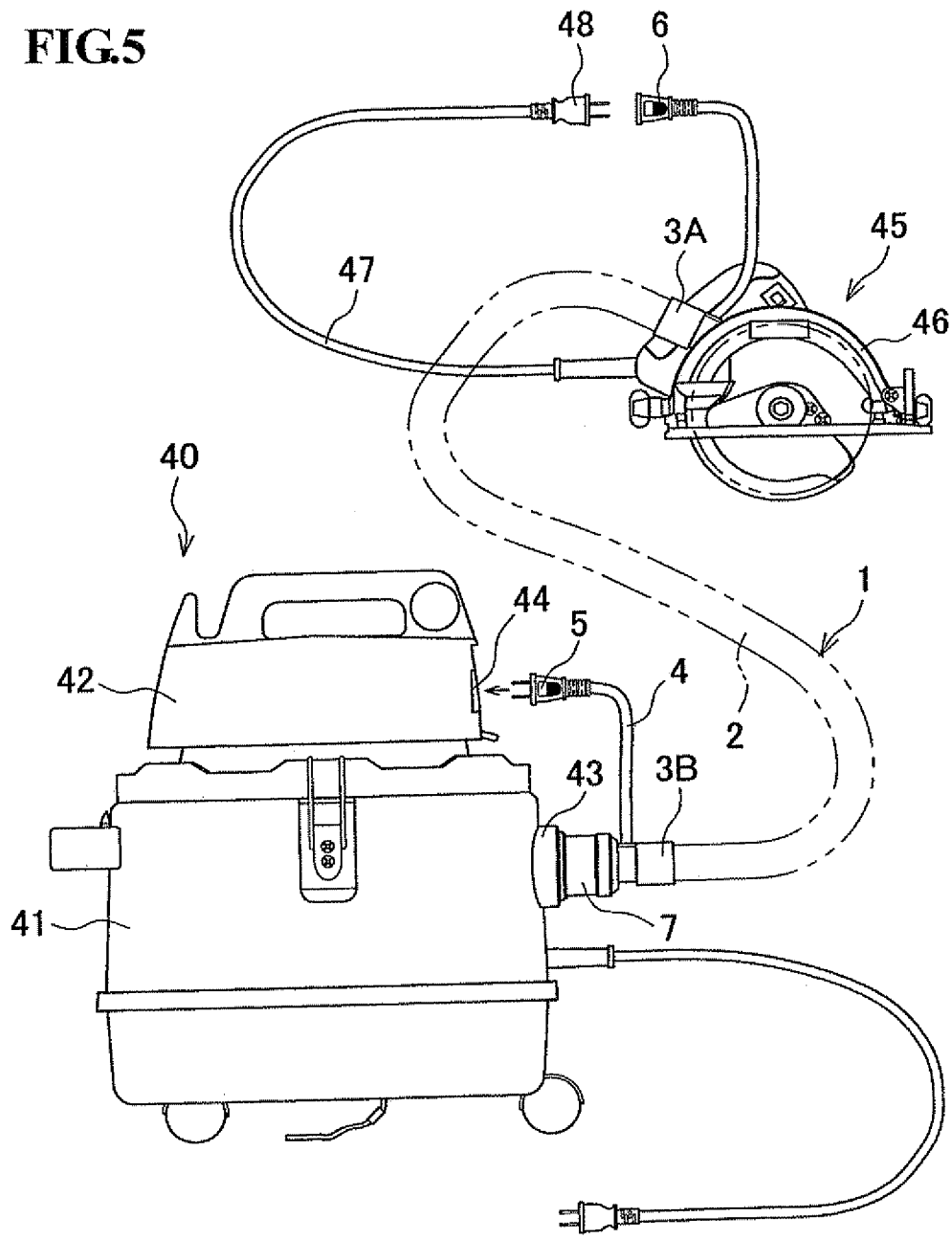
FIG. 5 is an illustrative view of a dust collector employing the corded hose.

As shown in FIG. 5, the corded hose 1 is connected between a dust collector 40 and an electric tool, for example, a circular saw 45 or the like. The dust collector 40 mentioned herein has a main body 42, which has a motor and a suction fan built therein and is installed on an upper portion of a tank 41, and has a suction port 43 protruding from a lateral face of the tank 41. Further, the dust collector 40 is equipped, in a lateral face of the main body 42, with a socket 44 for supplying power to an external component. Furthermore, through the changeover operation of a switch (not shown), the dust collection can be performed with single operation of the dust collector 40 or ganged operation in which the motor is operated in a ganged manner when the supply of power to the external component connected to the socket 44 is detected.

Accordingly, on the dust collector 40 side, the corded hose 1 has the rear cuff 7 connected in a plug-in manner to the suction port 43, and has the plug 5 of the power cord 4 plugged in the socket 44. On the other hand, on the circular saw 45 side, the corded hose 1 is used with the front cuff 8 connected to an exhaust cylinder (not shown) provided in a blade case 46, and with a plug 48 of a power cord 47 of the circular saw 45 plugged in the connector 6.

Accordingly, in the dust collector 40, when a switch of the circular saw 45 is turned on with ganged operation selected, commercial power is supplied from the socket 44 of the dust collector 40 to the circular saw 45 via the power cord 4 to make the circular saw 45 operational. Then, the dust collector 40, which detects the supply of power from the socket 44, starts operating. Therefore, the powder dust produced by the circular saw 45 is sucked into the suction port 43 via the flexible hose 2, captured by a filter provided between the tank 41 and the main body 42, and collected into the tank 41.

During this suction, the power cord 4 in the flexible hose 2 extends along the inner face of the flexible hose 2 due to the rib 18. Therefore, the power cord 4 does not hinder the suction of powder dust. When the switch of the circular saw 45 is turned off, the operation of the dust collector 40 is stopped as well.

Then, when the replacement or the like of the flexible hose 2, the power cord 4, or the like becomes necessary while the corded hose 1 is used, the power cord 4 can be easily taken out from the flexible hose 2 by removing the front cuff 8 and the rear cuff 7 from the tube holders 3A and 3B in the corded hose 1 and decomposing each of the tube holders 3A and 3B into the half cylinders 9 and 9. Accordingly, only the flexible hose 2 or the power cord 4 can be replaced alone. The same assembling procedure as described above is followed after replacement.

As described above, according to the corded hose 1 of the foregoing embodiment of the present invention, both the ends of the flexible hose 2 are provided with the tube holders 3 and 3 respectively. Each of the tube holders 3 and 3 is composed of the pair of the half cylinders 9 and 9, sandwiches a corresponding one of the ends of the flexible hose 2 in the assembled state of the half cylinders 9 and 9, and forms the pullout port 16 of the power cord 4 between the assembled ends of the half cylinders 9 and 9. Each of both the ends of the power cord 4 in the flexible hose 2 is pulled out to the outside from the pullout port 16 of a corresponding one of the tube holders 3 and 3 and held. As a result, the power cord 4 can be easily pulled out from the flexible hose 2 due to the tube holders 3, and assembling properties is improved. Further, since the component parts such as the flexible hose 2, the power cord 4, and the like can be replaced alone respectively, good repairing properties are ensured as well.

Especially in this case, each of the tube holders 3 is structured to be assembled by engaging the engaging pawl 10 formed on one of the half cylinders 9 with the engaged portion 13 formed in the other half cylinder 9. Thus, the tube holders 3 can be easily attached to and removed from the flexible hose 2, and assembling properties is further improved.

Further, the flexible hose 2 is sheathed with the mesh cover 23, and the cover holders 24, each of which is composed of the pair of the half cylinders 25 and 25 to fix the mesh cover 23 to the flexible hose 2 in a state of being assembled with the flexible hose 2, are provided on the outer periphery of the flexible hose 2 at the positions corresponding to both the ends of the mesh cover 23 respectively. Thus, the mesh cover 23 can be easily fixed, and the flexible hose 2 is favorably protected.

Furthermore, one of the half cylinders 9 of each of the tube holders 3 is provided with the rib 18 that keeps the power cord 4 from moving toward the center of the tube holder 3 at the pullout position of the power cord 4. Thus, the power cord 4 extends along the inner face of the flexible hose 2, and the resistance against the flow of air and powder dust in the flexible hose 2 is reduced. Accordingly, the efficiency of collecting dust can be restrained from deteriorating even when the power cord 4 is extended through the flexible hose 2.

It should be noted that although the cuffs are coupled to the tube holders respectively such that the tube holders can be connected to the dust collector or the like in the foregoing embodiment of the present invention, it is also appropriate to dispense with the cuffs and directly connect the tube holders to the dust collector or the electric tool.

Further, the shape of the tube holders is not limited to that of the foregoing embodiment of the present invention either, and an appropriate change in design can be made. For example, it is appropriate to link the half cylinders with each other by a thin hinge portion, change the number or shape of engaging pawls and positioning protrusions, dispense with the positioning protrusions and the holes, or provide both the half cylinders with ribs respectively. This holds true for the cover holders as well. In addition to the linking of the half cylinders with each other by the hinge portion and the changing of the shapes of the engaging pawls, the positioning recess portions, and the positioning protrusions, it is also appropriate to dispense with the cover holders, stretch the mesh cover to the ends of the flexible hose, and cause the tube holders to sandwich the ends of the flexible hose together with the ends of the mesh cover respectively.

Besides, a power cord unsheathed with a protection cover can also be employed. A dust collector to which a corded hose is connected may not be endowed with a gang function, or may be designed as a portable type instead of a stationary type as described in the foregoing embodiment of the present invention. The electric tool is not limited to the circular saw either. Various types of electric tools such as an electric drill and the like can be appropriately selected.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

EXPLANATION OF REFERENCE SYMBOLS

1 ... corded hose, 2 ... flexible hose, 3 (3A, 3B) ... tube holders, 4 ... power cord, 5 ... plug, 6 ... connector, 7 ... rear cuff, 8 ... front cuff, 9, 25 ... half cylinders, 10, 26 ... engaging pawls, 13, 28 ... engaged portions, 16 ... pullout port, 18 ... rib, 23 ... mesh cover, 24 ... cover holder, 40 ... dust collector, 41 ... tank, 42 ... main body, 43 ... suction port, 44 ... socket, 45 ... circular saw

The invention claimed is:

1. A corded hose comprising:
   a hose;
   a power cord extending through the hose; and
   cylindrical holders provided at both ends of the hose respectively, each of the cylindrical holders sandwiching a corresponding one of ends of the hose in a state in which a pair of half cylinders are assembled with each other and forming a pullout port of the power cord between assembled ends of the half cylinders, wherein
   each of both the ends of the power cord in the hose is pulled out to an outside from the pullout port of a corresponding one of the holders and held.

2. The corded hose according to claim 1, wherein
   each of the holders is assembled by engaging an engaging pawl formed on one of the half cylinders with an engaged portion formed in the other half cylinder.

3. The corded hose according to claim 2, wherein
   each of the holders is assembled by forming a hole in the one of the half cylinders and a positioning protrusion on the other half cylinder and inserting the positioning protrusion into the hole in addition to engagement of the engaging pawl with the engaged portion.

4. The corded hose according to claim 1, wherein
   the pullout port is so formed as to be inclined toward a proximal one of the ends of the hose.

5. The corded hose according to claim 1, wherein at least one of the half cylinders of each of the holders is provided with a rib that keeps the power cord from moving toward a center of the holder at a pullout position of the power cord.

6. The corded hose according to claim 1, wherein
   the hose is sheathed with a flexible sleeve-like cover, and is provided, on an outer periphery thereof at positions corresponding to both ends of the cover, with fixation cylinders respectively, each of the fixation cylinders being composed of a pair of half cylinders to fix the cover to the hose in a state of being assembled with the hose.

7. The corded hose according to claim 6, wherein
   each of the fixation cylinders is assembled by engaging an engaging pawl formed on one of the half cylinders with an engaged portion formed in the other half cylinder.

8. The corded hose according to claim 1, wherein
   the hose is a bellows-type flexible hose, and that each of the half cylinders of each of the holders has, on an inner periphery thereof, a protrusion strip engaging bellows of the flexible hose.

9. The corded hose according to claim 1, wherein
   one of the holders is connected to a cylindrical rear cuff which is to be joined to a dust collector, and that the other holder is connected to a cylindrical front cuff which is to be joined to an electric tool.

10. A dust collector comprising:
    a suction port;
    a socket for supplying power to an external component;
    the corded hose according to claim 1 having one of the holders connected to the suction port and having the power cord on the holder side connected to the socket, wherein
    the other holder of the corded hose and an electric tool are connectable, the power cord on the holder side and a power cord of the electric tool are connectable, respectively.

* * * * *